US012784341B2

(12) United States Patent
Young et al.

(10) Patent No.: US 12,784,341 B2
(45) Date of Patent: Nov. 3, 2026

(54) INSPECTION OF MICROELECTRONICS USING NEURAL NETWORK

(71) Applicant: ROCKWELL COLLINS, INC., Cedar Rapids, IA (US)

(72) Inventors: Shih-Yih Young, Marion, IA (US); Kristen Jerome, Monticello, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 207 days.

(21) Appl. No.: 18/619,612

(22) Filed: Mar. 28, 2024

(65) Prior Publication Data

US 2025/0308154 A1 Oct. 2, 2025

(51) Int. Cl.
*G06T 17/00* (2006.01)
*G06T 5/50* (2006.01)
(Continued)

(52) U.S. Cl.
CPC ................ *G06T 17/00* (2013.01); *G06T 5/50* (2013.01); *G06V 10/25* (2022.01); *G06V 10/56* (2022.01);
(Continued)

(58) Field of Classification Search
CPC . G06T 2207/10116; G06T 2207/10081; G06T 2207/20084; G06T 2207/20081; G06T 2207/30148; G06V 2201/07
See application file for complete search history.

(56) References Cited

U.S. PATENT DOCUMENTS

| | | | |
|---|---|---|---|
| 11,222,234 | B2 | 1/2022 | Wang |
| 11,423,577 | B2 | 8/2022 | Kelly et al. |
| 11,836,967 | B2 | 12/2023 | Liu et al. |

FOREIGN PATENT DOCUMENTS

| | | | |
|---|---|---|---|
| CN | 115187500 | A | 10/2022 |
| CN | 113052797 | B | 1/2024 |
| JP | 2023067546 | A | 5/2023 |

OTHER PUBLICATIONS

Lichtenwalter et al. "Detect industrial defects at low latency with computer vision at the edge with Amazon SageMaker Edge", Oct. 22, 2021, AWS Blogs, https://aws.amazon.com/blogs/machine-learning/detect-industrial-defects-at-low-latency-with-computer-vision-at-the-edge-with-amazon-sagemaker-edge (Year: 2021).*
Qianru Zhang: "Deep learning based solder joint defect detection on industrial printed circuit board X-ray images" Complex & Intelligent Systems (2022) 8:1525-1537.
Philipp Liznerski: "Explainable Deep One-Class Classification" conference paper at ICLR 2021, pp. 1-25.
(Continued)

*Primary Examiner* — Kee M Tung
*Assistant Examiner* — Thang Gia Huynh
(74) *Attorney, Agent, or Firm* — Millen, White, Zelano & Branigan P.C.; William F. Nixon

(57) ABSTRACT

A trained neural network model is used to identify anomalous solder balls in a ball grid array assembly. An x-ray system captures 3D x-ray model that is used to train the neural network model. The 3D x-ray model is converted into a colored 2D image. The image is discretized to generate a first image stack, a second image stack, and a third image stack. The image stacks are converted into greyscale images. The greyscale images are converted into a 2D color image. At least one solder ball is determined as being anomalous in one of the greyscale image stacks. At least one smaller color image patch is identified as having the at least one anomalous solder ball and at least one smaller color image patch is identified as including at least one normal solder ball. The smaller color image patches are used to train a neural network model.

19 Claims, 9 Drawing Sheets

(51) Int. Cl.
*G06V 10/25* (2022.01)
*G06V 10/56* (2022.01)

(52) U.S. Cl.
CPC ............... *G06T 2207/10116* (2013.01); *G06T 2207/20084* (2013.01); *G06T 2207/20221* (2013.01); *G06V 2201/07* (2022.01)

(56) References Cited

OTHER PUBLICATIONS

Y.J. Roh : "Inspection of Ball Grid Array(BGA) Solder Joints usingcX-ray Cross-sectional Images" Part of the SPIE Conference on Machine Vision Systems for Inspection and Metrology VIII. Boston, Massachusetts • Sep. 1999 SPIE vol. 3836.

Pramuditha Perera : "One-Class Classification: A Survey", arXiv:2101.03064 [cs.CV], (2021) https://doi.org/10.48550/arXiv.2101.03064 (pp. 1-19).

Jesse Davis : "The Relationship Between Precision-Recall and ROC Curves", Proceedings of the 23rd International Conference on Machine Learning, Pittsburgh, PA, 2006. (pp. 1-8).

Reza Ghaffarian : "Technology Readiness Overview: Ball Grid Array and Chip Scale Packaging", Technology Readiness Overview: BGA and CSP Packaging, NEPP Program Document, 2003, pp. 1-12.

* cited by examiner

INSPECTION OF MICROELECTRONICS USING NEURAL NETWORK

FIELD OF THE INVENTION

The present invention relates to training and using a neural network to identify possible anomalies within microelectronics packaging or chips.

DESCRIPTION OF THE RELATED ART

Advancements in microelectronic manufacturing enable microelectronic packages or chips to be more complex, which may result in an increasing number of solder joints for input and output signals. A printed circuit board (PCB) also is more densely populated with microelectronic components. Microelectronic packages with the ball grid array (BGA) type of solder joints also are more popular due to its many benefits. Microelectronic packages with BGA solder joints, however, may be difficult to inspect for defects after they are mounted on the PCB. The BGA solder joints are located at the bottom of the microelectronic package. The package body blocks the BGA solder joints from visual inspection after the package is mounted on the PCB.

A computed tomography (CT) scan machines that produce three-dimensional (3D) x-ray images and models may be used to perform non-destructive inspection (NDI) for packages and chips with BGA solder joints because x-rays can penetrate the package to capture the defects in BGA solder joints. After taking x-rays of the package, the x-ray data is processed to create a 3D model of the microelectronic package that can be visualized and examined with special software. With the visualization software, human inspectors inspect the 3D data to manually search for defects in the BGA solder joints that may not be found with 2D x-ray images, such as tilt, open, misalignment, and the like. The inspection step calls for human inspectors to visually search through stacks of 3D CT scan x-ray images for the defects. This process is time consuming, error prone, and strains the eyesight of the human inspector.

Thus, the tedious inspection of examining the 3D x-ray model should be automated as much as possible to reduce the burden on the human inspector while increasing accuracy in locating defects within the BGA solder joints.

SUMMARY OF THE INVENTION

In some embodiments, a method for training a neural network model is disclosed. The method includes discretizing a three-dimensional (3D) x-ray model of a plurality of ball grid array (BGA) solder balls to generate a first image stack, a second image stack, and a third image stack. The first image stack, the second image stack, and the third image stack are two-dimensional (2D) x-ray images. The method also includes converting the first image stack, the second image stack, and the third image stack into a respective greyscale image of each stack. The method also includes combining the first greyscale image stack, the second greyscale image stack, and the third greyscale image stack into a color image. The color image is a 2D image. The method also includes determining at least one solder ball as anomalous within at least one of the first greyscale image stack, the second greyscale image stack, and the third greyscale image stack. The method also includes identifying at least one first smaller color image patch within the color image as including at least one anomalous solder ball and at least one second smaller color image patch within the color image as including at least one normal solder ball. The method also includes training the neural network model with a set of color image patches including the at least one first smaller color image patch having the at least one anomalous solder ball and the at least one second smaller color image patch having the at least one normal solder ball. The neural network model is trained to predict an anomaly within the 3D x-ray model of the plurality of BGA solder balls.

In some embodiments, a method is disclosed. The method includes discretizing a three-dimensional (3D) x-ray model of a plurality of ball grid arrays (BGA) solder balls to generate a plurality of image stacks. Each image stack is a two-dimensional (2D) x-ray image. The method also includes converting each of the plurality of image stacks into a respective greyscale image of each stack. The method also includes combining each of the greyscale image stacks into a color image. The color image is a 2D image. The method also includes identifying a plurality of image patches within the color image. The plurality of image patches includes visual representations of the plurality of BGA solder balls. The method also includes providing the plurality of image patches to a trained neural network model. The method also includes executing the trained neural network model to determine whether each image patch of the plurality of image patches includes at least one anomalous solder ball. The method also includes highlighting, in the 3D x-ray model, the at least one anomalous solder ball in at least one image patch to have a possible defect determined by the trained neural network model.

In some embodiments, a method is disclosed. The method includes combining a plurality of greyscale image stacks of a first three-dimensional (3D) x-ray model of a plurality of ball grid array (BGA) solder balls into a color image. The color image is a two-dimensional (2D) image. The method also includes determining at least one solder ball as anomalous within one of the plurality of greyscale image stacks. The method also includes identifying at least one first smaller color image patch within the color image as including the at least one anomalous solder ball and at least one second smaller color image patch as including at least one normal solder ball. The method also includes training a neural network model with a set of color image patches including the at least one first smaller color image patch having the at least one anomalous solder ball and the at least one second smaller color image patch having the at least one normal solder ball. The neural network model is trained to predict an anomaly within the first 3D x-ray model of the plurality of BGA solder balls. The method also includes providing a plurality of image patches from a second 3D x-ray model to the trained neural network model. The method also includes executing the trained neural network model to determine whether each image patch of the plurality of image patches includes at least one anomalous solder ball. The method also includes highlighting, in the second 3D x-ray model, the at least one anomalous solder ball in at least one image patch to have a possible defect determined by the trained neural network model.

In some embodiments, the method also includes determining an anomaly score for the at least one image patch having the at least one anomalous solder ball. The method also includes determining whether the anomaly score for the at least one image patch is greater than an anomaly detection threshold. The method also includes, if the anomaly score for the at least one image patch is greater than the anomaly detection threshold, indicating that the at least one image patch includes the at least one anomalous solder ball.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE PREFERRED EMBODIMENTS

Figure 1:
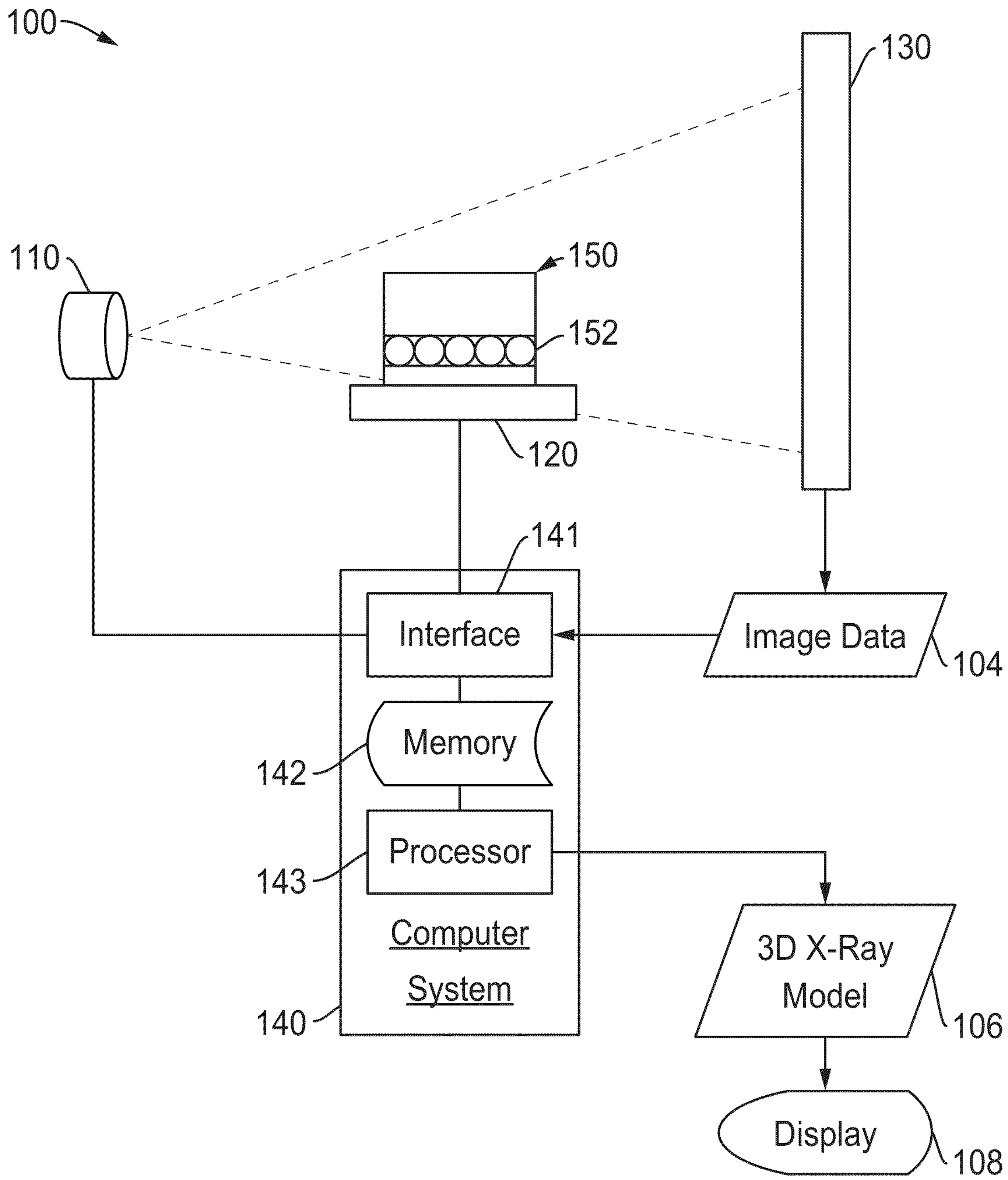
FIG. 1 illustrates a radiography imaging system according to the disclosed embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

In other instances, well-known features may not be described in detail to avoid unnecessarily complicating the instant disclosure. The inventive concepts disclosed herein are capable of other embodiments or of being practiced or performed in various ways. Further, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral, such as 1, 1a, or 1b. Such shorthand notations are used for purposes of convenience only, and should not be construed to limit the inventive concepts disclosed herein in any way unless expressly stated to the contrary.

Moreover, unless expressly stated to the contrary, “or” refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the “a” or “an” are employed to describe elements and components of embodiments of the instant inventive concepts. This is done merely for convenience and to give a general sense of the inventive concepts, and “a” and “an” are intended to include one or at least one and the singular also includes plural unless it is obvious that it is meant otherwise. It will be further understood that the terms “comprises” or “comprising,” when used in this specification, specify the presence of stated features, integers, steps, operations, elements, or components, but do not preclude the presence or addition of one or more other features, integers, steps, operations, elements, components, and/or groups thereof.

As used herein, any reference to “one embodiment,” or “some embodiments” means that particular element, feature, structure, or characteristic described in connection with the embodiment is included in at least one embodiment of the inventive concepts disclosed herein. The appearances of the phrase “in some embodiments” in various places in the specification are not necessarily all referring to the same embodiment, and embodiments of the inventive concepts disclosed may include one or more of the features expressly described or inherently present herein, or any combination or sub-combination of two or more such features, along with any other features that may not necessarily be expressly described or inherently present in the instant disclosure.

The inventive concepts may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Inventive concepts may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed below.

The disclosed embodiments automate the tedious inspection step with 3D x-ray images to reduce the burden on an inspector as well as increases accuracy in locating defects within the BGA solder joints, or balls. The disclosed embodiments train a neural network model with discretized 3D CT scan x-ray images to predict defects automatically and accurately in the BGA solder joints. Further, a heuristic algorithm may compute the probability of confidence for the defect prediction provided by the neural network model so that a confidence about the accuracy of each defect prediction is provided.

A deep learning algorithm, such a fully convolutional data description (FCDD) that belongs to the one class classification (OCC) family, may be adapted to train a neural network model to identify anomalies. By using the one class classification approach, the disclosed embodiments remove the task of collecting many defective images to successfully train a neural network model to predict multiple different types of defects. After a neural network model is fully trained with discretized 3D CT scan x-ray images, the neural network model may be used to examiner new 3D x-ray images to locate defects in BGA solder joints. If the x-ray image is determined by the trained neural network model to be defective, then the trained neural network model will highlight the locations of the BGA solder joints that are identified as anomalous or defective. In addition, the probability of confidence for this anomaly prediction is determined through a heuristic algorithm. Thus, inspectors may locate the defective BGA solder joints in a quicker manner as well as have the confidence about the accuracy of the defect prediction.

The disclosed embodiments automate the tedious inspection process with 3D CT scan x-ray images to reduce workload of the inspector, while maintaining inspection accuracy. The disclosed embodiments also discretize 3D CT scan x-ray images to preserve the 3D defective information, while significantly reducing the computational time and memory requirement. The disclosed embodiments also compute the probability of confidence for each defect prediction.

The BGA solder joints are used with greater frequency as connectors between microelectronic packages and the printed circuit board (PCB) due to their benefits over other types of connectors. Microelectronic packages with BGA solder joints, however, may be difficult to inspect for defects after they are mounted on the PCB. A set of 3D CT scan x-ray images may be used to inspect BGA solder joints in detail. Many types of defects with BGA solder joints may occur, such as bridging, excessive/insufficient solder, open or missing solder joints, voids, and the like. When issues occur with BGA solder joints after the packages are mounted on the PCB, technicians may individually CT scan the microelectronic package with BGA solder joints to create a 3D x-ray image model to help identify defects. Given enough image resolution, a 3D x-ray image model can capture typical BGA defects in detail.

The disclosed embodiments combine three different 2D planes of a 3D x-ray model into a single 2D image and then automatically locate and divide the region(s) of interest (ROI) on the 2D image into a set of many smaller image patches to be used for training a neural network model. The disclosed embodiments provide a solution for processing a 3D CT scan x-ray model directly, which can be computationally expensive and take up a lot of memory. With the approach, the disclosed embodiments may train a neural network model to efficiently process 2D images that contain 3D information of CT scan x-ray models. In addition, a substantial amount of training image patches of BGA solder joints may be obtained with just a few 3D x-ray models.

With a substantial number of x-ray image patches available, a deep learning algorithm, such as fully convolutional data description (FCCD), may be adapted to train a neural network to identify anomalies. Because this is an OCC-based algorithm, normal images, or images without defects, may be used for training. After the neural network model is fully trained, it can be used to evaluate new x-ray images to locate defects within the BGA solder joints.

FIG. 1 depicts a radiography imaging system 100 according to the disclosed embodiments. Radiography imaging system 100 includes a source 110 providing electromagnetic radiation, a supporting platform 120 for positioning a package 150 having BGA solder balls 152, a detector 130 to collect image data, and a computer system 140 having an interface device 141, a memory device 142, and a processor 143 coupled to source 110, supporting desk 120, and detector 130.

In some embodiments, source 110 of radiography imaging system 100 may be an x-ray source, a γ-ray source, an e-beam source, or another radiation source. Source 110 may be driven control signals or instructions based on present control programs to provide a proper dose of electromagnetic radiation toward package 150 on supporting platform 120. In some embodiments, supporting platform 120 is equipped with a robot handler to load and unload package 150 having BGA solder balls 152 one by one through an inspection process for a large quantity of manufactured electronic devices. Supporting platform 120 also may be controlled by the present control programs during an inspection process.

Detector 130 may include various image sensors configured to detect the radiations passed through package 150 and convert the received radiation signals into image data. Detector 130 is configured to detect radiation, such as x-rays, radiated from source 110. X-rays may be referred to in this disclosure when discussing radiation from source 110, but, as noted above, this term may include other types of radiation. Detector 130 is configured to convert detected radiation into electrical signals. Detector 130 may be a flat panel detector. Detector 130 also may be comprised of a plurality of conversion elements and pixel electrodes arranged on the plurality of conversion elements. The plurality of conversion elements and pixel electrodes are aligned at predetermined cycles (pixel pitches) along the Z and Y directions. Image data 104 of detector 130 is transmitted to computer system 140.

Interface device 141 of computer system 140 may be configured to electronically couple respectively with source 110, supporting platform 120, and detector 130 of system 100. Memory device 142 may be configured to store data, a control program, an image process program, a task program, and network parameters, based on which a convolutional neural network is built and trained according to the disclosed embodiments. Processor 142 of computer system 140 may be configured to execute the control program to send control signals/instructions via interface device 141 within system 100. Based on the control signals/instructions, system 100 controls loading/unloading package 150 to and from supporting platform 120 before or after image capture, controls driving source 110 to illuminate a certain dose of electromagnetic radiation to package 150 on supporting platform 120, and controls detector 130 to collect image data.

Processor 143 may be configured through interface device 141 to receive image data 104 converted from an initial image of package 150 captured by detector 130. Image data 104 may be stored in memory device 142. Processor 143 may be configured to execute the image process program to convert image data 104 of the initial image to one or more feature images using the region-of-interest (ROI) location method and store each feature image having a feature element, such as a solder joint, in a center region of an enclosing box that defines the feature image. The feature image having one feature element like a solder ball of the BGA chip may be stored to memory device 142. The feature image may be processed to reduce noise using a median filtering method or Gaussian filtering method. The feature image also may be processed to enhance contrast using grayscale linear transformation and a unsharp mask image method.

In some embodiments, processor 143 of computer system 140 is configured to execute at least a first task program stored in memory device 142 to extract a target feature vector corresponding to the feature image using the convolutional neural network (CNN). The CNN has been trained based on a training sample set including multiple images having at least two different types, such as normal and anomalous, associated with solder joints using BGA solder balls 152.

Processor 143, in some embodiments, may be an image processor that is configured to generate an x-ray phase contrast image, or 3D x-ray model 106, based on each intensity distribution of the radiation detected by detector 130 when images of package 150 are captured. Processor 143 is configured to generate the 3D x-ray phase contrast image when images of package 150 are captured. System 100 captures images at a plurality of image-capture positions while rotating package 150 using supporting platform 120. Processor 143 generates 3D x-ray model 106 based on image data 104 captured at the plurality of image-capture positions. In some embodiments, image data 104 captured at the image-capture positions may be aligned.

Memory 141 may be configured to store image data 104 and 3D x-ray model 106 generated by processor 143. Memory 141 may be a hard disk drive (HDD) or a non-volatile memory such as a solid state drive (SSD). A display 108 may display 3D x-ray model 106 generated by computer system 140. For example, display 108 may be an LCD monitor to show 3D x-ray model 106.

Figure 2:
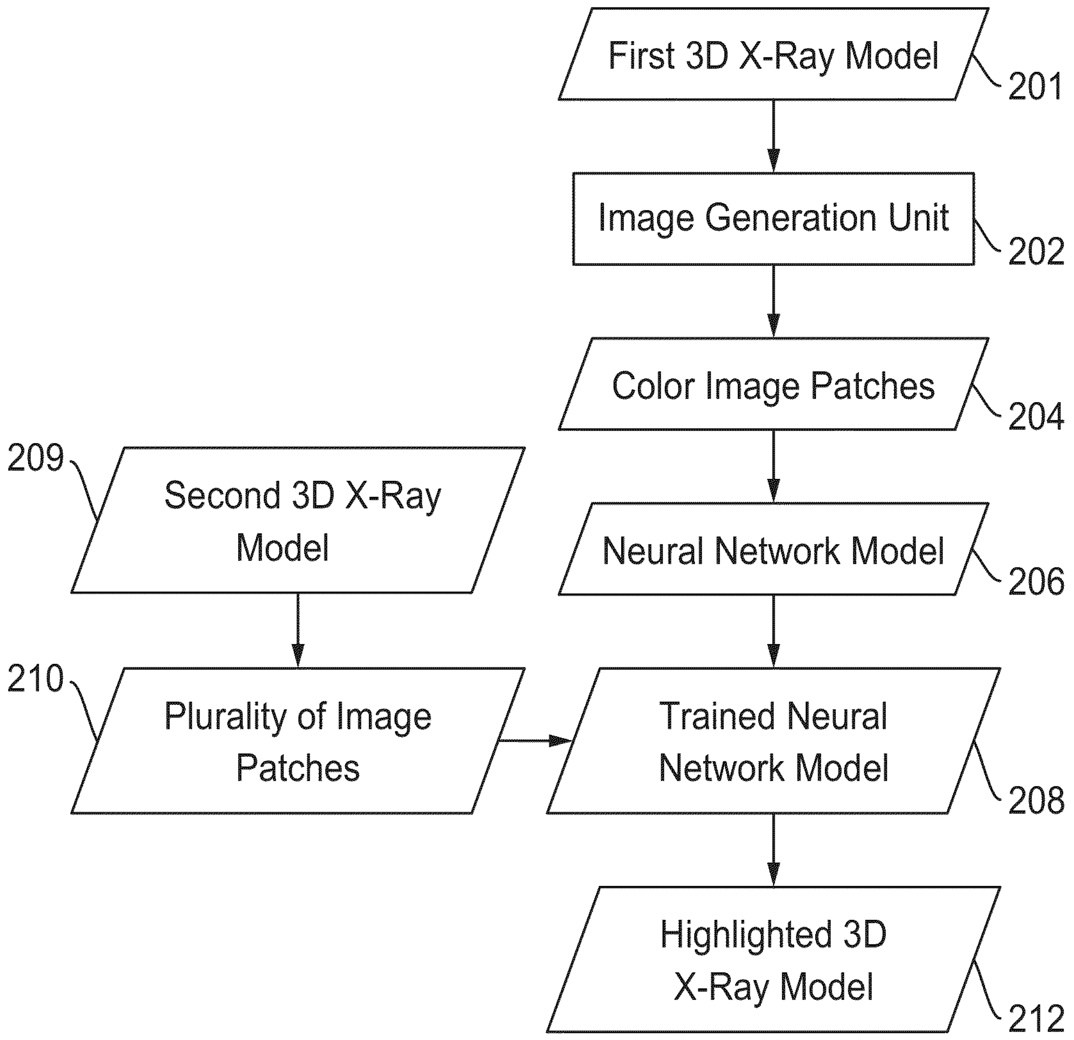
FIG. 2 illustrates a block diagram of components for training and using a trained neural network model to identify anomalous solder balls in a highlighted 3D x-ray model according to the disclosed embodiments.

FIG. 2 depicts a block diagram of components for training and using a trained neural network model 208 to identify anomalous solder balls in a highlighted 3D x-ray model 212 according to the disclosed embodiments. The disclosed embodiments may use image generation unit 202 to produce color image patches 204 to train neural network model 206 to generate trained neural network model 208. Trained neural network model 208 then may receive a plurality of image patches 210 from a second 3D x-ray model 209 to determine any possible anomalous solder balls in a BGA item.

A first 3D x-ray model 201 may be generated using system 100, disclosed above. First x-ray model 201 may be generated like 3D x-ray model 106 using package 150 having BGA solder balls 152. First x-ray model 201 is provided to image generation unit 202, which performs operations disclosed in greater detail below to generate color image patches 204. Color image patches 204 may be 2D image patches based on the data within first 3D x-ray model 201. In some embodiments, image generation unit 202 may be a processing unit. The processing unit may correspond to computer system 140 by including memory 142 and processor 143. Memory 142 may store instructions that configure processor 143 to perform the operations disclosed herein for image generation unit 202.

Color image patches 204 are used to train neural network model 206. As disclosed above, neural network model 206 may use FCDD to train itself using color image patches 204 generated by image generation unit 202. Trained neural network model 208 may result after training. Trained neural network model 208 is used to detect anomalies in BGA solder balls used in PCB products. Thus, second 3D x-ray model 209 also may be generated by system 100, similar to 3D x-ray model 106. A plurality of image patches 210 may be generated. In some embodiments, image generation unit 202 may generate the image patches.

Trained neural network model 208 analyzes plurality of image patches 210 to determine BGA solder ball defects, as shown in highlighted 3D x-ray model 212. Highlighted 3D x-ray model 212 may by second 3D x-ray model 209 showing or highlighting the solder balls possibly having defects within the model. Further, the disclosed embodiments may provide a confidence, or anomaly, score for the identified defects to further show the probability of the defect. The anomaly score also may be compared to a threshold before determining the identified solder balls as defective and highlighted as such.

Figure 3A:
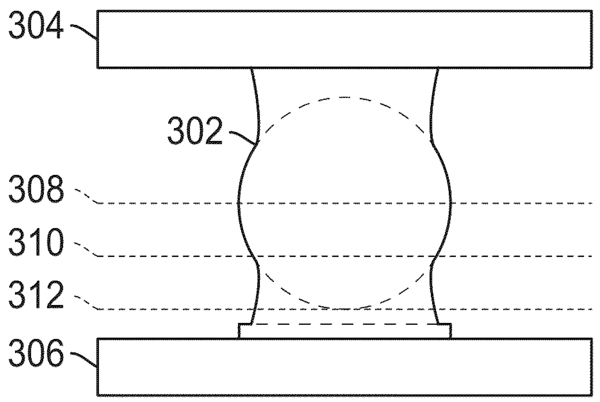
FIG. 3A illustrates an example of the three planes used for generating image stacks according to the disclosed embodiments.

FIG. 3A depicts an example of the three planes used for generating image stacks according to the disclosed embodiments. Solder ball 302 may be one of a plurality of solder balls used in a BGA. The solder balls may connect the bottom 304 of a package to a pad 306 on a PCB. In some instances, defects may occur between this connection. The disclosed embodiments may discretize first 3D x-ray model 201 into three image stacks, with each image stack, or generated image, being along a plane intersecting each of solder balls 302. The planes may be shown in a top-down view by the image stacks.

For example, plane 312 just above a pad 306 on the PCB having solder balls 302 may be for deriving a stack. This stack may be referred to as stack C. Plane 308 about halfway between the top of solder balls 302 and plane 312 may be for deriving another stack, which may be referred to as stack A. Plane 310 is the plane about halfway between plane 312 and plane 308, and is used for deriving a third stack, which may be referred to as stack B. Image generation unit 202 may include a 3D viewer to perform these operations.

Image generation unit 202 may save each of the stacks from planes 308, 310, and 312 from the same reference point with first 3D x-ray model 201. The stacks may be saved in a BMP file format. The stacks, or images, generated using planes 308, 310, and 312 are 2D x-ray images.

Figure 3B:
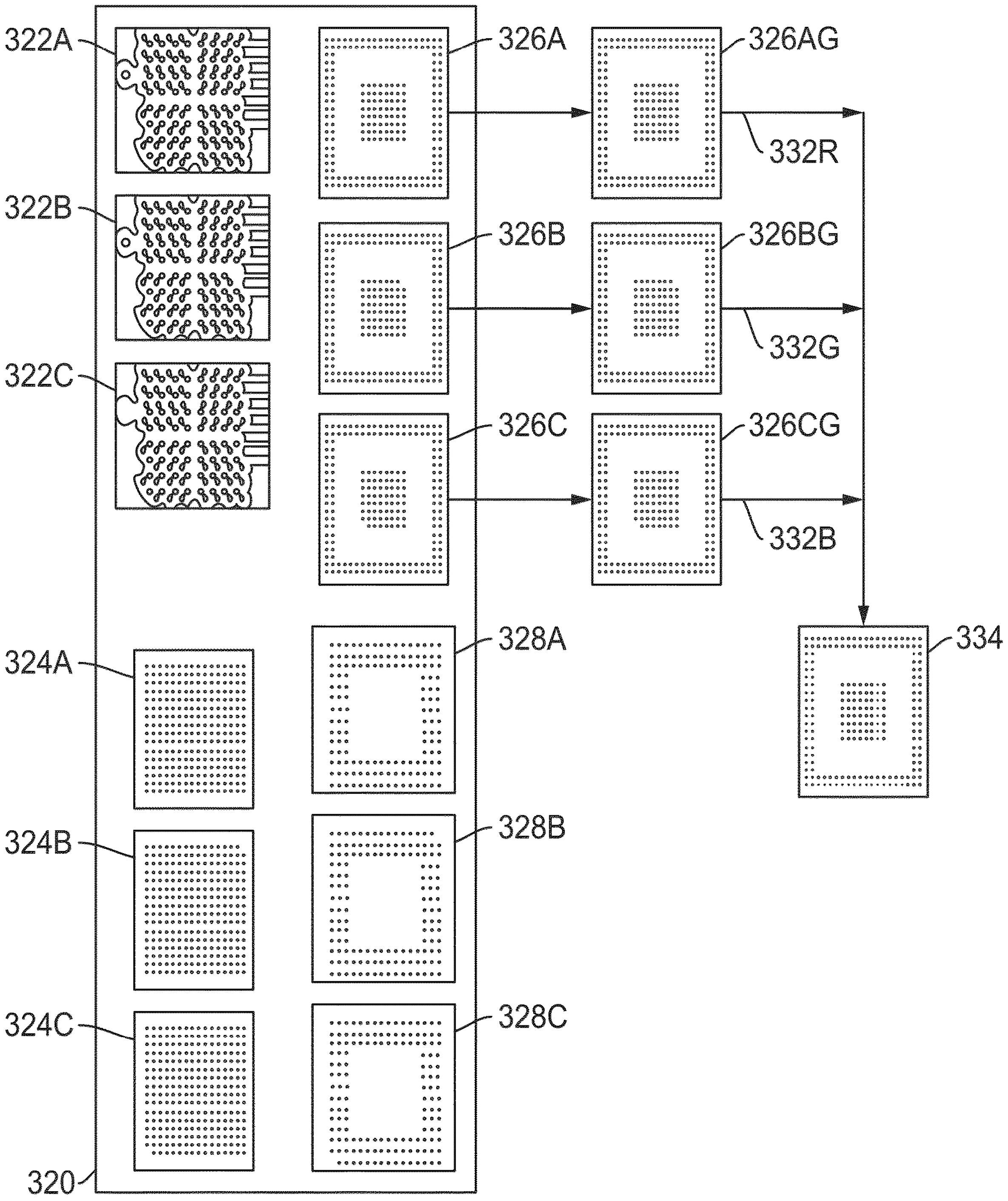
FIG. 3B illustrates a block diagram of the process to combine images stacks into a colored 2D image according to the disclosed embodiments.

FIG. 3B illustrates a block diagram of the process to combine images stacks into a colored 2D image 334 according to the disclosed embodiments. The next operation performed using image generation unit 202 is combining the three 2D image stacks derived using planes 308, 310, and 312 into a single 2D colored image 334 to represent a discretized 3D x-ray model of the BGA solder joints. Sets of image stacks 320 may include different 2D images, or image stacks, taken from different 3D x-ray models.

For example, image stacks 322A, 322B, and 322C are 2D images derived from a 3D x-ray model at planes 308, 310, and 312, respectively. Image stacks 324A, 324B, and 324C are 2D images also derived from planes 308, 310, and 312, respectively. As may be shown, the pattern of solder balls 302 differ between image stacks 322A-C and image stacks 324A-C. Thus, it may be appreciated that the different sets of image stacks are not from the same 3D x-ray model. Image stacks 326A, 326B, and 326C are 2D images also derived from planes 308, 310, and 312, respectively. Image stacks 328A, 328B, and 328C are 2D images also derived from planes 308, 310, and 312, respectively. Again, the patterns for solder balls 302 within the different stacks are not identical as they are derived from separate 3D x-ray models.

For each set of image stacks, operation 330 converts each image stack into a greyscale image stack. Taking image stacks 326A, 326B, and 326C, these image stacks are converted into greyscale image stacks 326AG, 326BG, and 326CG, respectively. After the conversion, each greyscale image stack 326AG, 326BG, and 326CG has a single channel because it is a greyscale image. The disclosed embodiments then map the greyscale image stacks to RGB channels. Thus, greyscale image stack 326AG is mapped to red channel 332R. Greyscale image stack 326BG is mapped to green channel 332G. Greyscale image stack 326CG is mapped to blue channel 332B.

The greyscale images 326AG, 326BG, and 326CG are combined after being mapped to channels 332R, 332G, and 332B, respectively. The colored images are combined to generate colored 2D image 334. Colored 2D image 334 may be an RGB image after combining image stacks 326A, 326B, and 326C derived, for example, from first 3D x-ray model 201. The combination of three 2D greyscale images into colored 2D image 334 may be used as input for neural network model 206. Discretized 3D information is captured in colored 2D image 334, thereby providing a better opportunity to catch anomalies. Further, there are more pretrained neural networks with colored 2D images available for transfer learning. Moreover, neural networks that are processing colored 2D images have a smaller number of tunable parameters relative to neural networks processing 3D models, which allows for faster training time and less required memory.

Figure 4:
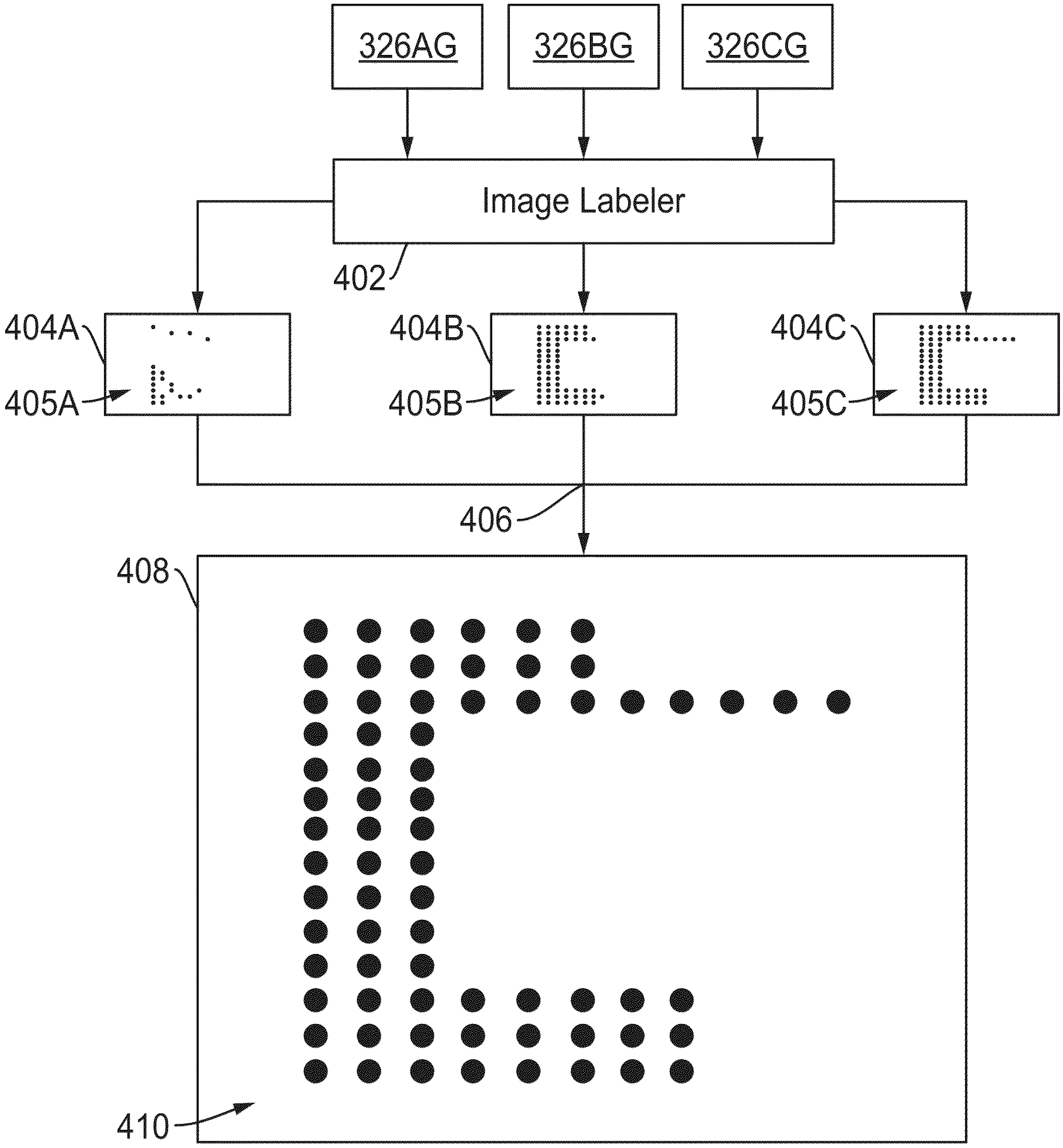
FIG. 4 illustrates a process for generating a final mask image for a set of image masks according to the disclosed embodiments.

FIG. 4 depicts a process for generating final mask image 408 for a set of image masks according to the disclosed embodiments. The process may receive greyscale image stack 326AG based on image stack 326A, greyscale image stack 326BG based on image stack 326B, and greyscale image stack 326CG based on image stack 326C. Image labeler 402 may load the greyscale image stacks to mark anomalies thereon. Anomalies are labeled on the three greyscale 2D images. A label may be created and denoted as an anomaly. The anomalies and the locations are marked and saved.

Image labeler 402 may create a masked image to mark the locations of anomalies for each stack. Thus, masked image 404A may be generated showing marked locations 405A of anomalies for greyscale image stack 326AG. Masked image 404B may be generated showing marked locations 405B of anomalies for greyscale image stack 326BG. Masked image 404C may be generated showing marked locations 405C of anomalies for greyscale image stack 326CG. Operation 406 executes by combining masked images 404A, 404B, and 404C to generate final mask image 408.

The disclosed embodiments generate final mask image 408 to mark the locations of anomalies for each stack. When the region of interest is divided into smaller image patches, the disclosed embodiments combine the three masked images of stacks 326A, 326B, and 326C into a single masked image by taking the element-wise logical OR operation of the three masked images:

$$imgMask_{ABC} = \text{mask}_A | \text{mask}_B | \text{mask}_C \qquad \text{Equation 1}$$

Thus, if a location is marked as an anomaly on masked image 404A, masked image 404B, or masked image 404C, then the location will be marked as an anomaly on final mask image 408. Locations 410 of final mask image 408 may correspond to locations 405A, 405B, and 405C showing anomalies in the masked images. Locations not marked as anomalies may also be shown within final mask image 408. Final mask image 408 may be used when creating smaller image patches for input into neural network model 206.

Figure 5A:
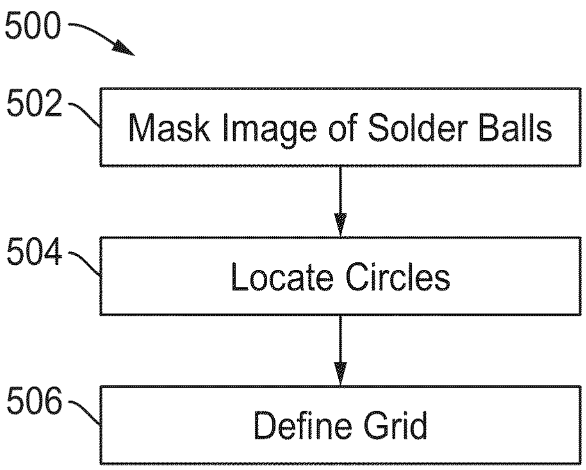
FIG. 5A illustrates a flowchart for determining a region of interest within a colored 2D image according to the disclosed embodiments.
Figure 5B:
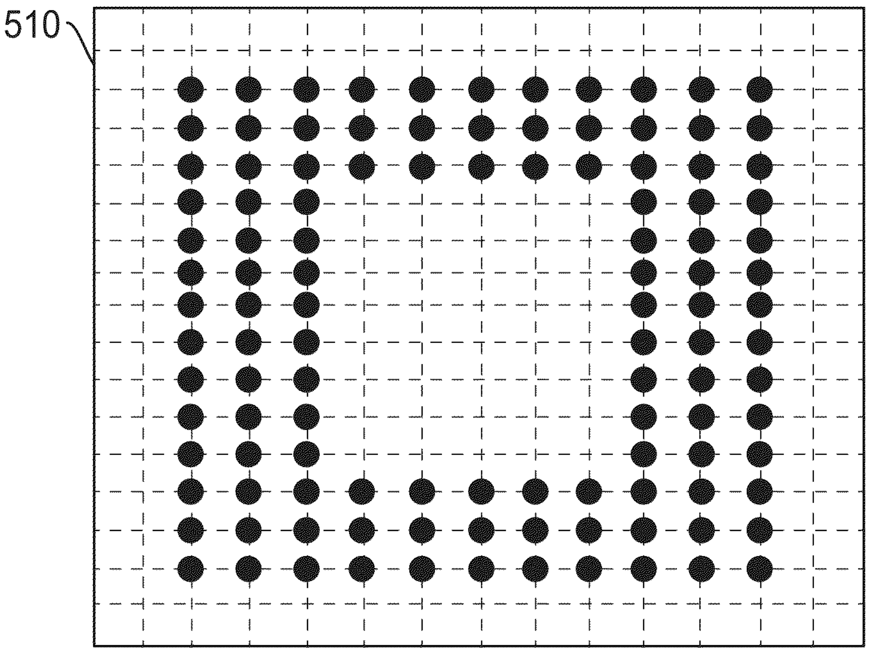
FIG. 5B illustrates a masked image for use in determining the region of interest according to the disclosed embodiments.

FIG. 5A depicts a flowchart 500 for determining a region of interest within a colored 2D image according to the disclosed embodiments. FIG. 5B depicts a masked image 510 for use in determining the region of interest according to the disclosed embodiments. Flowchart 500 may refer to FIGS. 1-4 for illustrative purposes. Flowchart 500, however, is not limited to the embodiments disclosed by FIGS. 1-4.

Because only the BGA solder joints should be inspected, the disclosed embodiments locate all BGA solder balls 302 within a 2D x-ray image, such as colored 2D image 334. This operation is done so that other cluttering information on the image may be removed. The locations of BGA solder balls 302 may be found by masking the solder balls on the image.

Step 502 executes by masking an image, such as colored 2D image 334. Masking can be achieved by first converting the red, green, and blue channels of colored 2D image to hue, saturation, and value (HSV) channels of an HSV image. Then, the range of numbers on channel 3 of an HSV image that can isolate solder balls 302 should be determined. The actual range may vary between images. FIG. 5B shows an example of a masked image 510 after masking pixels with values between [0.4 1.0] of the 3rd channel in the HSV image. This mask of BGA solder balls may be saved for later use in processing operations.

Step 504 executes by locating circles within masked image 510. After masking solder balls 302, the disclosed embodiments may locate the circles in masked image 510. A function $f$ to determine circles within masked image 510 may be defined as $$[\text{centers, radii}] = f(img, [r_{min} r_{max}]), \quad \text{Equation 2}$$

Where, centers is a two-column matrix containing the (x,y) coordinates of the circle centers, radii are the radii in pixels corresponding to each circle center in centers, img is an image, $r_{min}$ is the minimum radius in pixels of the identified circles, and $r_{max}$ is the maximum radius in pixels of the identified circles.

The disclosed embodiments may use a function to search for circles using the circular Hough transform in masked image 510, with $r_{min}$=6 and $r_{max}$=50.

Step 506 executes by defining a grid around solder balls 302. The disclosed embodiments use the centers of the circles (centers0 from Equation 2) to determine the grid of points by reindexing the sequence in centers so that the x coordinate is in increasing order.

Next, the disclosed embodiments determine the spacing between columns, such as the pitch between two neighboring solder balls, by taking the difference between consecutive x coordinates of centers. Given n circle centers, if A=(centers(1,1), centers(2,1), . . . centers(n,1)), then the sequential difference may be defined as $$\Delta A = [a(i) - a(i-1)],\ j = [2, \ \ , n] \quad \text{Equation 3}$$

Then, the disclosed embodiments can get an approximate spacing between columns by first using the (1.5*average radius) to determine a lower bound;

$$tmpPitch = \left\lfloor \frac{3}{2n} \sum_{i=1}^{n} \text{radii}_i \right\rfloor \quad \text{Equation 4}$$

Then, a subsequence B is created with only unique column points from sequence A by including only elements i from A where ΔA exceeds tmpPitch:

$$B = [a(k)],\ k = i, \text{ for all integers } i \text{ with } \Delta A(i) > \text{tmpPitch} \quad \text{Equation 5}$$

And the approximate pitch between columns is updated based on the average difference of B that has m elements of $b_i$.

$$\text{pitch} = \left\lfloor \frac{1}{2} + \frac{1}{m} \sum_{i=2}^{m} (b_i - b_{i-1}) \right\rfloor \quad \text{Equation 6}$$

The column indices are defined so that the column aligns between the solder balls by shifting each element of B by [pitch/2]

$$X = B[\text{pitch}/2] \quad \text{Equation 7}$$

For defining the rows of the grid, we use the center of the circles (centers) from Equation 2 and reindex the sequence in centers so that the y coordinate is in increasing order. Letting A=(center(1,1), center(1,2), . . . center(1,n)) and repeating Equations 3-6, the row indices may be defined as Equation 7. Thus, masked image 510 may be superimposed with a grid created by X by Y set of all ordered pairs (x,y). Each ordered pair (x,y) represents a location within colored 2D image 334 that will be used to capture a smaller image patch for training neural network model 206.

Figure 6A:
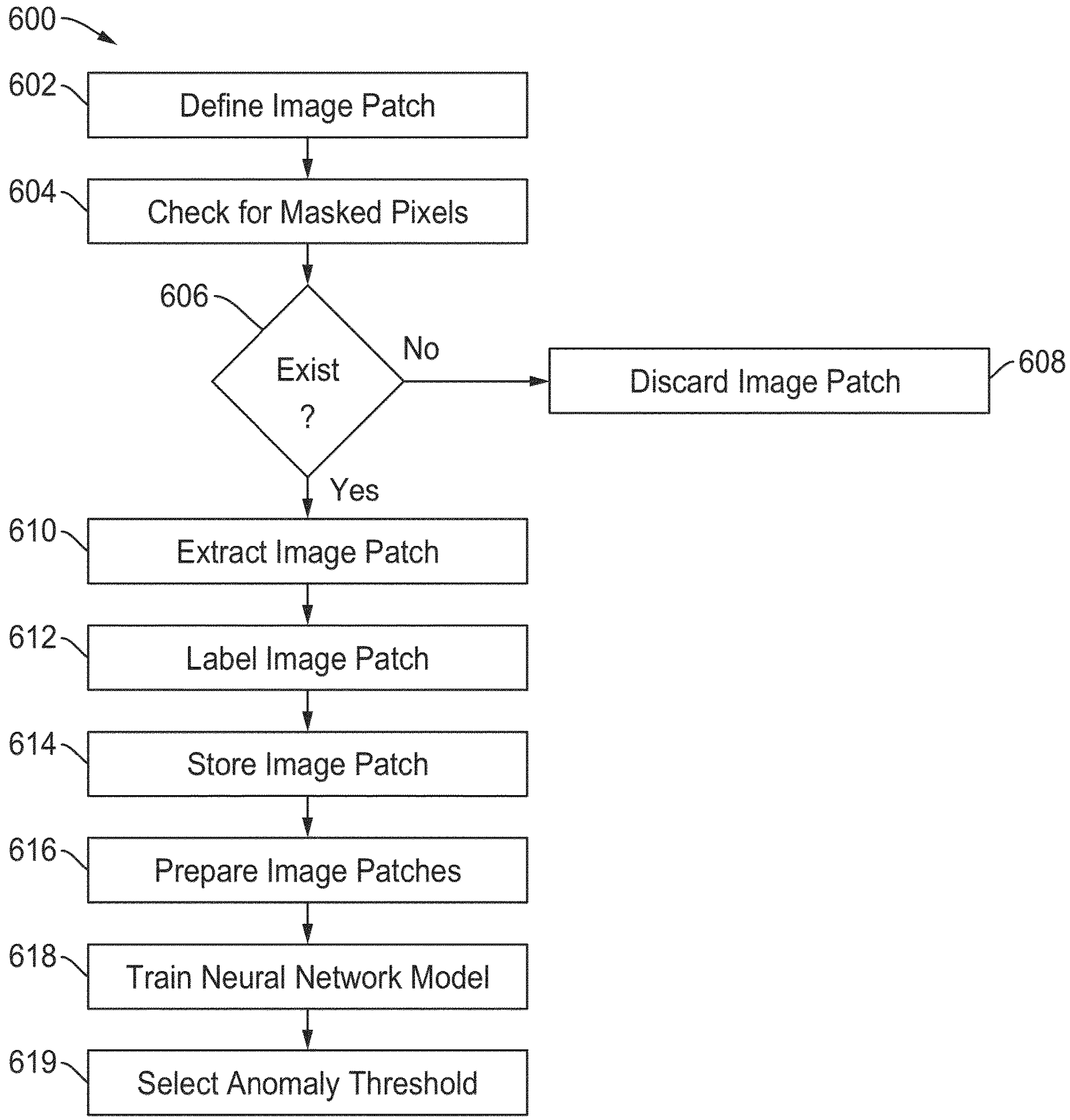
FIG. 6A illustrates a flowchart for identifying color image patches for training a neural network model according to the disclosed embodiments.

FIG. 6A depicts a flowchart 600 for identifying color image patches for training neural network model 206 according to the disclosed embodiments. Flowchart 600 may refer to FIGS. 1-5B for illustrative purposes. Flowchart 600, however, is not limited to the embodiments disclosed be FIGS. 1-5B.

Figure 6B:
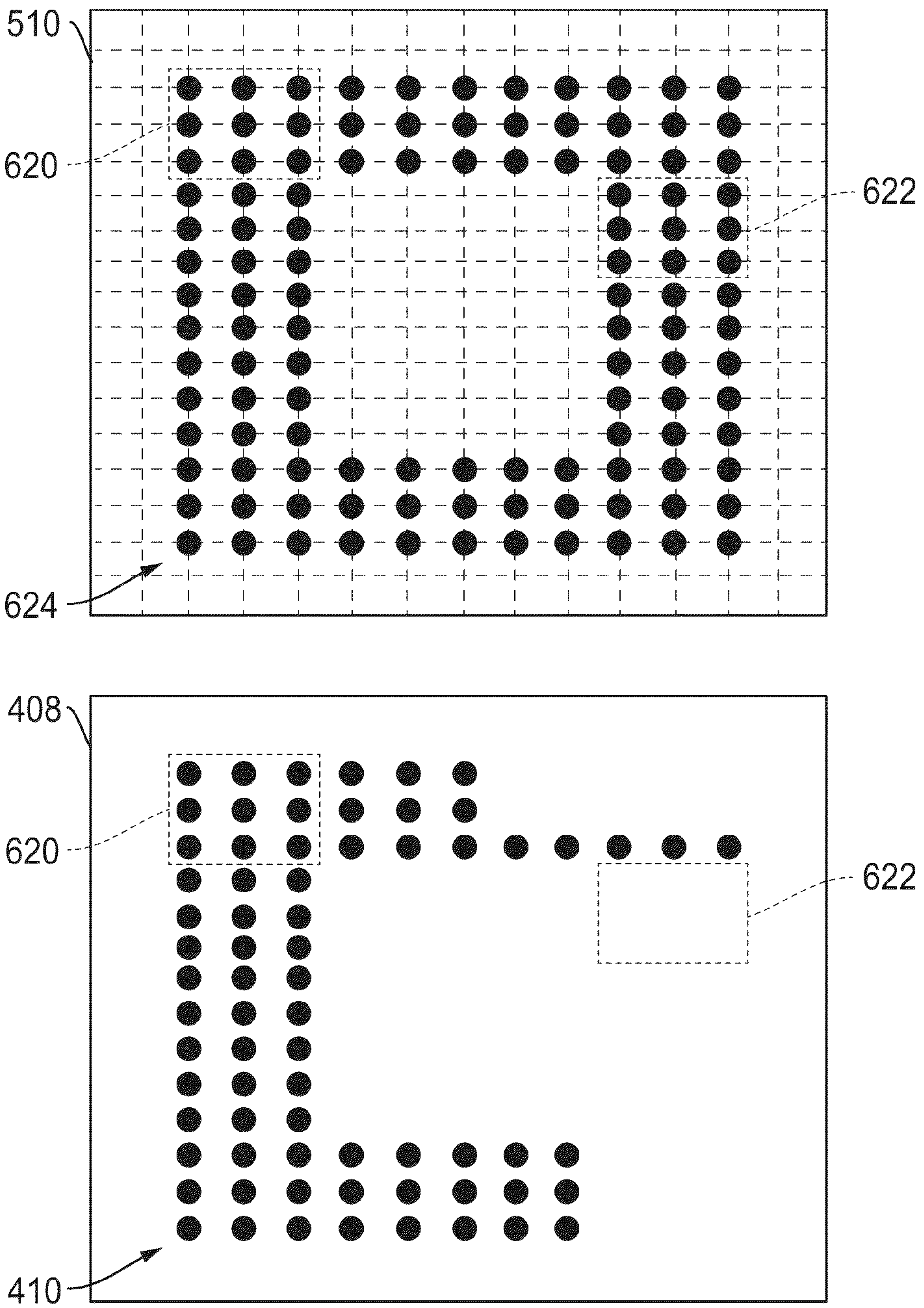
FIG. 6B illustrates a final mask image and a masked image as used with flowchart 600 according to the disclosed embodiments.
Figure 6C:
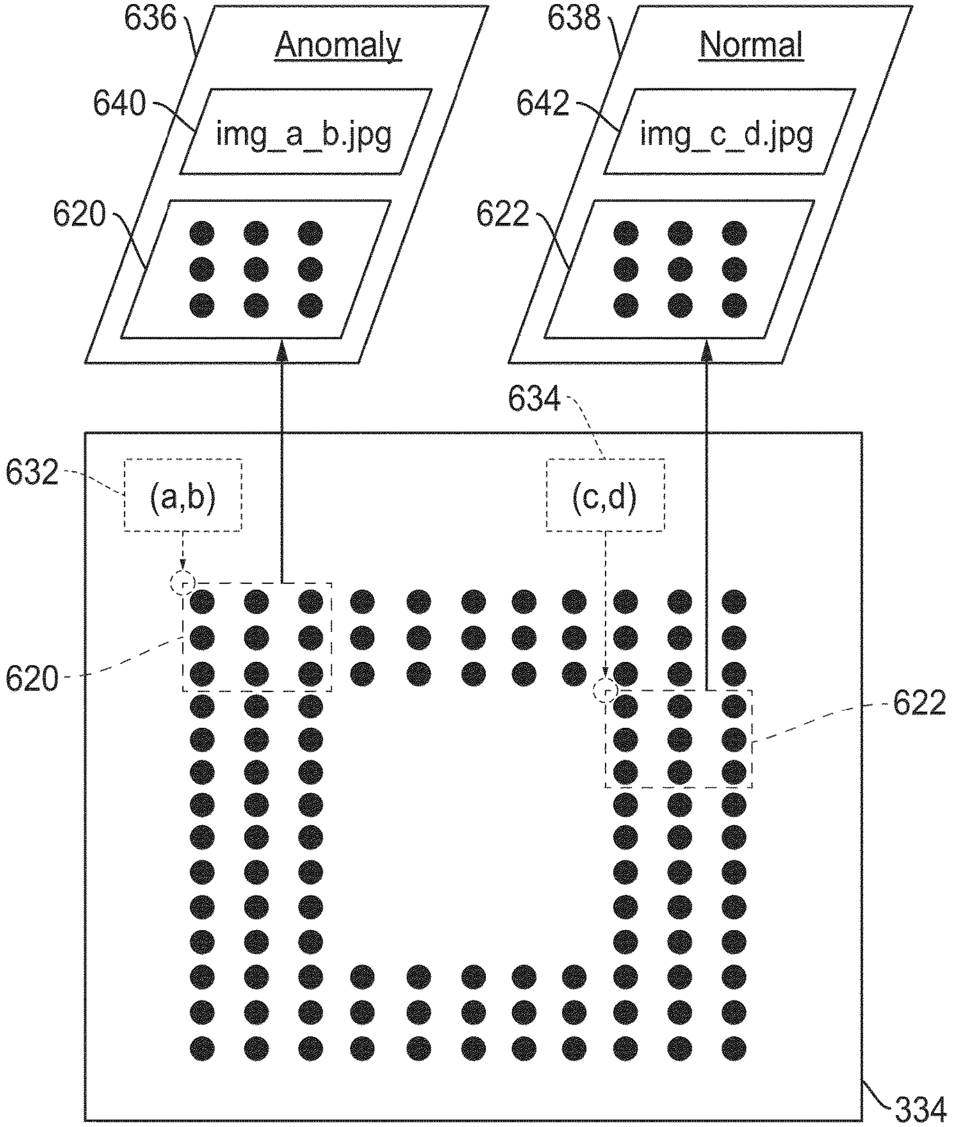
FIG. 6C illustrates a block diagram of operations for storing image patches according to the disclosed embodiments.
Figure 6D:
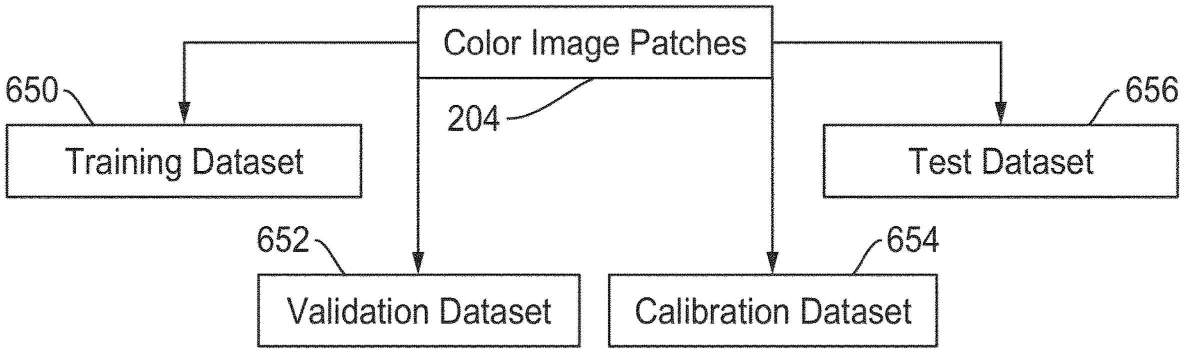
FIG. 6D illustrates a block diagram of the datasets for the image patches according to the disclosed embodiments.

FIG. 6B depicts final mask image 408 and masked image 510 as used with flowchart 600 according to the disclosed embodiments. FIG. 6C depicts a block diagram of operations for storing image patches according to the disclosed embodiments. FIG. 6D depicts a block diagram of the datasets for the image patches according to the disclosed embodiments.

This feature of the disclosed embodiments slices an input image, such as colored 2D image 334, into many small image patches. The image patches, shown as color image patches 204, may contain only BGA solder balls that are used to train neural network model 206. Thus, the background cluttering information on the x-ray images does not significantly impact the performance or training of neural network model 206.

Step 602 executes by defining an image patch for identification operations. The input image is divided in a manner that results in the smaller image patches having, at most, a specified number of solder balls. For example, the maximum number of solder balls within an image patch may be nine (9) in a 3×3 grid. The input image may be represented as an m×n matrix, wherein m represents the number of rows and n represents the number of columns. Then each ordered pair in Y by X is a point to collect a smaller p×q submatrix from the input image. Because a 3×3 grid of solder balls is desired, $p=3*\text{pitch}_y$ and $q=\text{pitch}_x$, wherein pitch is determined from Equation 6 above for X and then Y. Image patches may overlap with each other in some embodiments.

Step 604 executes by checking for masked pixels at the same region of masked image 510. Referring to FIG. 6B, image patch regions 620 and 622 are shown. Defined image patches 620 and 622 may correspond to identified image patches in the input image, or colored 2D image 334. Other image patches may be defined in masked image 510. In fact, though not shown, masked image 510 includes image patches over the entire image, with the image patches defined according to the parameters above. As disclosed above, masked image 510 include masked pixels 624 showing where solder balls 302 are located. The disclosed embodiments check to see if the image patches on masked image 510 includes one or more masked pixels 624.

Step 606 executes by determining whether a masked pixel 624 exists in the image patch being considered. If no, then step 608 executes by discarding the image patch for that location as masked image 510 shows that no masked pixels are within this region. If step 606 is yes, then step 610 executes by extracting the image patch. Referring to FIG. 6B, image patches 620 and 622 include masked pixels 624 showing locations of solder balls 302. Thus, masked image 510 enables to identification of image patches that will be of interested in training neural network model 206.

Step 612 executes by labeling the image patch under consideration after it is extracted. In some embodiments, the image patch may be assigned a label, such as anomaly or normal, by checking the pixels of final mask image 408 as the same region location of the image patch. An image patch is assigned the label of anomaly if the region corresponding to the image patch in final mask image 408 contains at least one location 410 showing an anomaly. Otherwise, the image patch is labeled as normal.

Referring to FIG. 6B, image patch 620 within final mask image 408 includes locations 410, showing anomalies as determined in FIG. 4. Image patch 620 shows at least one solder ball 302 probably having a defect, or an anomaly. In contrast, image patch 622 does not include any locations 410 on final mask image 408. Thus, image patch 622 does not include any solder balls 302 having anomalies. These labels are used to sort the image patches to be used in training neural network model 206.

Step 614 executes by storing the image patch in the proper location or under the proper label for training neural network model 206. The image patch is saved as an image file with the top left coordinates saved in the label name so that the image patches may be pieced back together later. Referring to FIG. 6C, the input image, shown here as colored 2D image 334, is cropped to extract the image data related to the identified image patches as having solder balls 302.

Image patch 620 is cropped and stored to anomaly folder 636. Image patch 620 may be defined by top left coordinates 632, shown as (a, b), within colored 2D image 334. It is stored in anomaly folder 636 with top left coordinates 632 in label name 640. Image patch 622 is cropped and stored to normal folder 638. Image patch 622 may be defined by top left coordinates 634, shown as (c, d) within colored 2d image 334. This image patch is stored in normal folder 638 with top left coordinates 634 in label name 642. Thus, the image patches may be sorted by whether they are labeled as anomalous and according to their locations in the input image.

Step 616 executes by preparing the image patches, or color image patches 204, for training neural network model 206. Step 618 executes by training neural network model 206 with color image patches 204. These steps are disclosed together below. The disclosed embodiments may adapt a fully convolutional data description model (FCDD) as neural network model 206 trained with color image patches 204 from anomaly folder 636 and normal folder 638. The FCCD model may be a type of deep OCC that can provide an up-sampled image to help explain anomaly locations along with an anomaly score. The input layer for the FCCD model may require the input image to have a size of 224×224×3. As a result, color image patches 204, such as image patches 620 and 622, may be resized before being input into neural network model 206 for training.

Color image patches 204 in anomaly folder 636 and normal folder 638 may be divided into four datasets of training, validation, calibration, and test. Referring to FIG. 6D, training dataset 650, validation dataset 652, calibration dataset 654, and test dataset 656 are shown. Training dataset 650 includes image patches that may be augmented so that some are randomly rotated by 90 degrees, reflected horizontally, or reflected vertically. The image patches in training dataset 650 are used to train neural network model 206. Validation dataset 652 is periodically used during training to prevent neural network model 206 from overfitting to the training data. Calibration dataset 654 may be reserved for determining the anomaly threshold, disclosed below. Test dataset 656 may be used to check the performance of trained neural network model 208 for its accuracy and other statistical performance metrics.

Step 619 executes by selecting an anomaly threshold to label an image patch evaluated by trained neural network 208 as normal or anomalous. Trained neural network model 208 accepts plurality of image patches 210 and returns a set of corresponding anomaly scores as $$s = \phi(imgs), \qquad \text{Equation 8}$$

where, ϕ is the trained neural network model, and imgs are the set of image patches that make a complete BGA x-ray image. Using anomaly scores, s, to label an image patch as either normal or anomalous, a detection threshold, or $T_{anomaly}$, is determined so that $$s \le T_{anomaly} \Rightarrow \text{normal} \qquad \text{Equation 9}$$

$$s > T_{anomaly} \Rightarrow \text{anomalous} \qquad \text{Equation 10}$$

To determine $T_{anomaly}$, color image patches 204 from calibration dataset 654 are evaluated by trained neural network model 208 to predict their anomaly scores. Determination of anomaly scores is disclosed in greater detail below. A receiver operation characteristic curve (ROC) may be constructed. The ROC curve plots the true positive rate (TPR) in the Y-axis over the false positive rate (FPR) in the X-axis by varying the detection threshold. The choice for the anomaly threshold is the detection threshold that maximizes the difference between TPR and FPR, or $$T_{anomaly} = \arg\max\ f(TPR_x - FPR_x) \text{ for } x \in \{x_1, \ldots, x_n\} \qquad \text{Equation 11}$$

where, x is on threshold in the sequence of varying detection thresholds, n is the total number of detection thresholds used to create the ROC curve, $FPR_x$ is the false positive rate for x, and $TPR_x$ is the true positive rate for x. The disclosed embodiments also may save back the maximum value of f $(TPR_x–FPR_x)$ as $J_{max}$ and a weighting factor w as disclosed below to compute the confidence probability of being anomalous for each patch of the BGA image from plurality of image patches 210.

Figure 7:
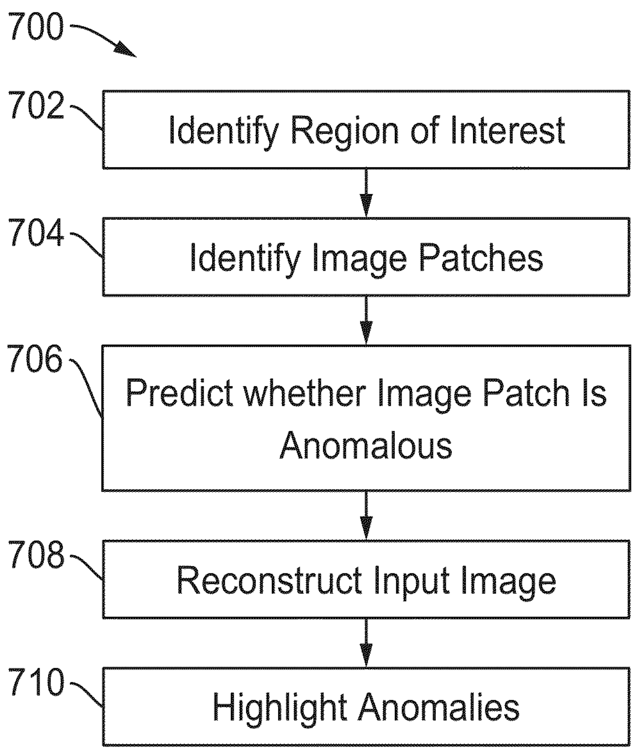
FIG. 7 illustrates a flowchart for determining anomalous solder balls within a 3D x-ray model according to the disclosed embodiments.

FIG. 7 depicts a flowchart 700 for determining anomalous solder balls within a 3D x-ray model according to the disclosed embodiments. Flowchart 700 may refer to FIGS. 1-6D for illustrative purposes. Flowchart 700, however, is not limited to the embodiments disclosed by FIGS. 1-6D.

Once trained neural network model 208 is available and its anomaly threshold determined, the model is ready for evaluating new x-ray images, such as second 3D x-ray model 209 disclosed in FIG. 2. Step 702 executes by identifying a region of interest within the x-ray model. Step 704 executes by identifying image patches, or a plurality of image patches 210 from second 3D x-ray model 209. The embodiments disclosed in FIGS. 3A, 3B, 5A, 5B, 6A, and 6B may be referred to in executing these steps to determine the image patches within a colored 2D image.

Step 706 executes by predicting whether an image patch of the input image is anomalous. With plurality of image patches 210 and trained neural network model 208, the disclosed embodiments perform prediction to determine the input x-ray images as normal or anomalous. A sequence of anomaly scores may correspond to the input images. If the anomaly score provided by trained neural network model 208 is greater than the anomaly threshold, disclosed above, determined for trained neural network model 208, then the corresponding image patch is labeled as suspect.

Step 708 executes by reconstructing the input image, or colored 2D image, having plurality of image patches 210. All patches identified as anomalous are collected. The x and y coordinates are extracted from the file name of each image patch. The (x,y) coordinate pair links the patch to the original location within the input image, much like label names 640 and 642.

Step 710 executes by highlighting image patches within the input image for second 3D x-ray model 209 based on the identified anomalous image patches. A heatmap may be collected of each suspected patch by pulling the activation values from trained neural network model after an up-sampling layer. The heatmap may be a grey-scaled 2D image that is the same size as the input image, wherein the input image may be the resized image patch.

Given a BGA image, such as colored 2D image 334, with a size of m×n, the disclosed embodiments create a temporary m×n image of all zeros. The disclosed embodiments then take each heatmap and convert it to a binary image, scale back to the original image patch size, p×q, translate it to the original position with the input image, and copy all masked pixel to the temporary m×n image. Using these operations, predicted defective areas may be presented on the original input image to a human inspector.

Thus, after trained neural network model 208 is created, it may be used to evaluate new x-ray images of BGA solder joints by automatically cropping image patches from the input x-ray image around the regions of interest to provide anomalous scores to each patch. Anomalous image patches are then collected, and suspect regions are highlighted on the original x-ray image to facilitate the inspection by human inspectors. Further, an anomaly threshold may be used in identifying image patches as being suspect.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

Modifications and equivalents may be made to the features of the claims without departing from the spirit or scope of the invention. Thus, it is intended that the present invention covers the modifications and variations disclosed above provided that these changes come within the scope of the claims and their equivalents.

The invention claimed is:

1. A method for training a neural network model, the method comprising:

discretizing a three-dimensional (3D) x-ray model of a plurality of ball grid array (BGA) solder balls to generate a first image stack, a second image stack, and a third image stack, wherein the first image stack, the second image stack, and the third image stack are two-dimensional (2D) x-ray images;

locating the plurality of BGA solder balls within the 3D x-ray model to generate a BGA masked image;

converting the first image stack, the second image stack, and the third image stack into a respective greyscale image of each stack;

combining the first greyscale image stack, the second greyscale image stack, and the third greyscale image stack into a color image, wherein the color image is a 2D image;

determining at least one solder ball as anomalous within at least one of the first greyscale image stack, the second greyscale image stack, and the third greyscale image stack;

identifying at least one first smaller color image patch within the color image as including at least one anomalous solder ball and at least one second smaller color image patch within the color image as including at least one normal solder ball; and training the neural network model with a set of color image patches including the at least one first smaller color image patch having the at least one anomalous solder ball and the at least one second smaller color image patch having the at least one normal solder ball, wherein the neural network model is trained to predict an anomaly within the 3D x-ray model of the plurality of BGA solder balls.

2. The method of claim 1, wherein the first image stack, the second image stack, and the third image stack are generated from a common reference point.

3. The method of claim 1, wherein discretizing the 3D x-ray model includes generating the first image stack from a plane within the 3D x-ray model of the BGA solder joints just above a pad connected to the BGA solder joints.

4. The method of claim 3, further comprising generating the second image stack from a plane halfway between a top of the BGA solder joints and the plane of the first image stack.

5. The method of claim 4, further comprising generating the third image stack from a plane halfway between the plane for the first image stack and the plane for the second image stack.

6. The method of claim 1, wherein combining includes mapping the first greyscale image stack to a first color channel, mapping the second greyscale image stack to a second color channel, and mapping the third greyscale image stack to a third color channel, wherein the color image includes colors of the first color channel, the second color channel, and the third color channel.

7. The method of claim 1, further comprising masking the first greyscale image stack to mark the at least one solder ball as anomalous, masking the second greyscale image stack to mark the at least one solder ball as anomalous, and masking the third greyscale image stack to mark the at least one solder ball is anomalous.

8. The method of claim 7, further comprising combining the masked first greyscale image stack, the masked second greyscale image stack, and the masked third greyscale image stack into a combined masked image having the at least one anomalous solder balls.

9. The method of claim 8, wherein identifying includes using the combined masked image to identify the at least one first smaller color image patch and the at least one second smaller color image patch.

10. The method of claim 1, wherein identifying includes using the BGA masked image to identify the at least one first smaller color image patch and the at least one second smaller color image patch.

11. The method of claim 1, further comprising augmenting the at least one first smaller color patch or the at least one second smaller color patch to modify a feature of the respective color patch.

12. The method of claim 1, further comprising determining an anomaly detection threshold for the set of color patches using the neural network model.

13. A method comprising:

discretizing a three-dimensional (3D) x-ray model of a plurality of ball grid array (BGA) solder balls to generate a plurality of image stacks, wherein each image stack is a two-dimensional (2D) x-ray image;

locating the plurality of BGA solder balls within the 3D x-ray model to generate a BGA masked image;

converting each of the plurality of image stacks into a respective greyscale image of each stack;

combining each of the greyscale image stacks into a color image, wherein the color image is a 2D image;

identifying a plurality of image patches within the color image, wherein the plurality of image patches includes visual representations of the plurality of BGA solder balls;

providing the plurality of image patches to a trained neural network model;

executing the trained neural network model to determine whether each image patch of the plurality of image patches includes at least one anomalous solder ball; and highlighting, in the 3D x-ray model, at least one anomalous solder ball in at least one image patch to have a possible defect determined by the trained neural network model.

14. The method of claim 13, further comprising determining an anomaly score for the at least one image patch having the at least one anomalous solder ball.

15. The method of claim 14, further comprising determining whether the anomaly score for the at least one image patch is greater than an anomaly detection threshold.

16. The method of claim 15, wherein, if the anomaly score for the at least one image patch is greater than the anomaly detection threshold, indicating that the at least one image patch includes the at least one anomalous solder ball.

17. The method of claim 15, further comprising including the anomaly score for the at least one image patch as highlighted in the 3D x-ray model.

18. A method comprising:

combining a plurality of greyscale image stacks of a first three-dimensional (3D) x-ray model of a plurality of ball grid array (BGA) solder balls into a color image, wherein the color image is two-dimensional (2D);

determining at least one solder ball as anomalous within one of the plurality of greyscale image stacks;

identifying at least one first smaller color image patch within the color image as including at least one anomalous solder ball and at least one second smaller color image patch within the color image as including at least one normal solder ball;

training a neural network model with a set of color image patches including the at least one first smaller color image patch having the at least one anomalous solder ball and the at least one second smaller color image patch having the at least one normal solder ball, wherein the neural network model is trained to predict an anomaly within the first 3D x-ray model of the plurality of BGA solder balls;

providing a plurality of image patches from a second 3D x-ray model to the trained neural network model;

executing the trained neural network model to determine whether each image patch of the plurality of image patches includes at least one anomalous solder ball; and highlighting, in the second 3D x-ray model, the at least one anomalous solder ball in at least one image patch to have a possible defect determined by the trained neural network model.

19. The method of claim 18, further comprising determining an anomaly score for the at least one image patch having the at least one anomalous solder ball;

determining whether the anomaly score for the at least one image patch is greater than an anomaly detection threshold; and if the anomaly score for the at least one image patch is greater than the anomaly detection threshold, indicating that the at least one image patch includes the at least one anomalous solder ball.

* * * * *